UNITED STATES PATENT OFFICE.

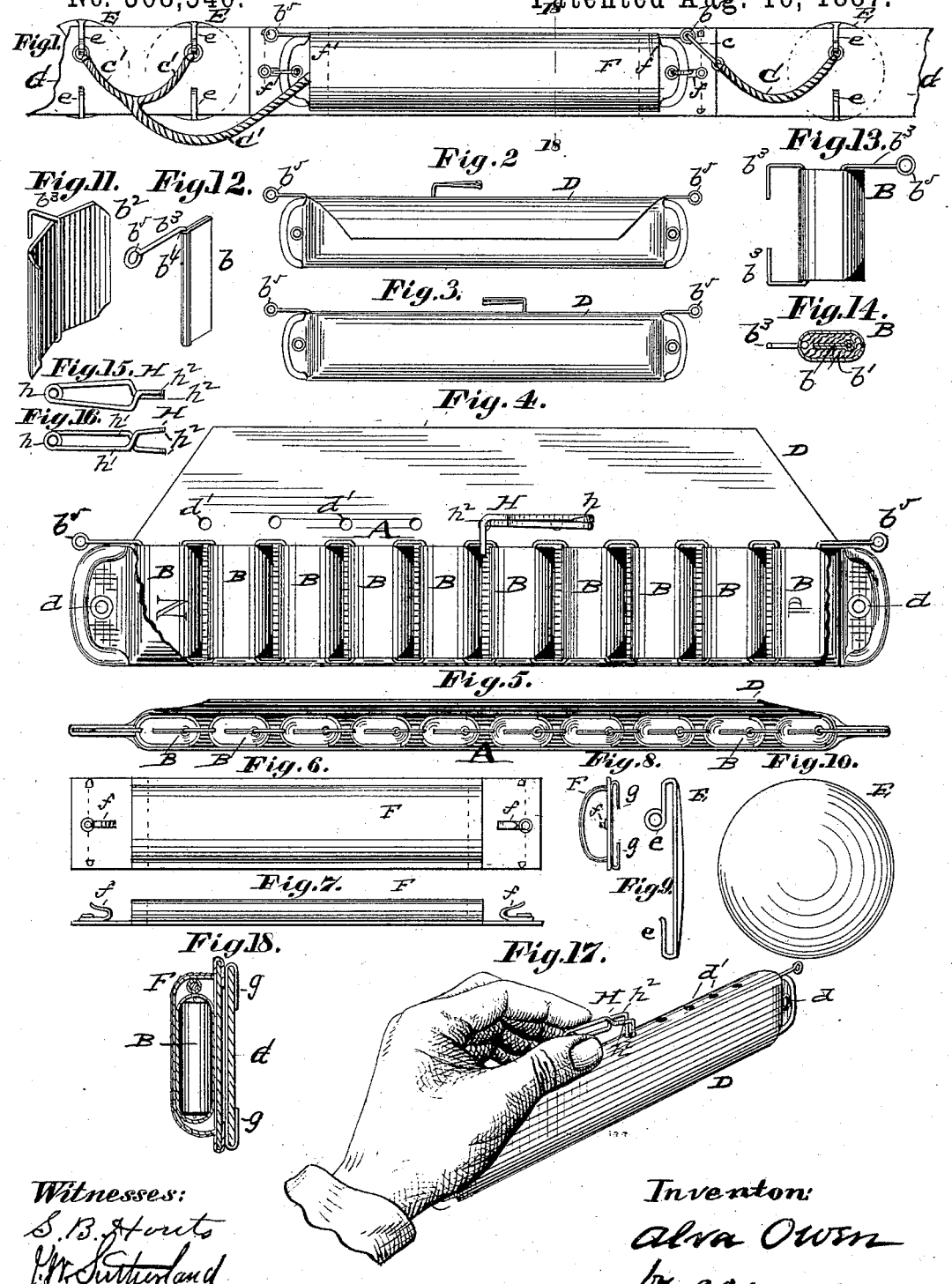

ALVA OWEN, OF ST. LOUIS, MISSOURI.

ELECTRIC BELT.

SPECIFICATION forming part of Letters Patent No. 368,546, dated August 16, 1887.

Application filed August 16, 1886. Serial No. 211,039. (No model.)

*To all whom it may concern:*

Be it known that I, ALVA OWEN, of St. Louis, Missouri, have made a new and useful Improvement in Electric Belts, of which the following is a full, clear, and exact description.

A prominent feature of the belt is its intensity and power in proportion to its compactness. Other features will be hereinafter noted and claimed.

The improvement consists in attaching the disks or electrodes so that they can be adjusted upon the belt to apply the current at any desired point or points; in the means for reversing the current, so that either the positive or the negative electrode can be applied; in the means for connecting the conductor-cord with the battery, and for adjusting it thereupon; in making the battery-case adjustable upon the belt, so that the battery can be arranged in various positions upon the person; in the mode of connecting the conductor-cord with two or more disks or electrodes, and in the construction and combination of the elements of the battery, all substantially as is represented in the annexed drawings, making part of this specification, and in which—

Figure 1 is a front elevation of that portion of the belt having the battery and the electrodes. Fig. 2 is a front elevation of the battery in its case. Fig. 3 is an elevation of the opposite side to that shown in Fig. 2. Fig. 4 is an elevation upon an enlarged scale, showing the battery with its case opened. Fig. 5 is a plan of the battery as shown in Fig. 4. Fig. 6 is a front elevation of the main or outer battery-case, or part used to connect the battery and inner case with the belt. Fig. 7 is a plan of the main or outer battery-case. Fig. 8 is an end elevation of the last-named case. Fig. 9 is an edge and Fig. 10 is a front elevation of one of the disks or electrodes. Fig. 11 is a view in perspective of one of the zincs of the battery, the zinc being opened out and the copper wire being soldered to the zinc. Fig. 12 is a view in perspective of one of the coppers of the battery. Fig. 13 is a side elevation of one of the cells of the battery. Fig. 14 is a plan of the cell. Fig. 15 is a plan of the clamp used to connect the conductor-cord with the battery. Fig. 16 is another view of the clamp opened. Fig. 17 is a view in perspective, illustrating the mode of making the connection of the cord with the battery; and Fig. 18 is a section on the line 18 18 of Fig. 1.

The same letters of reference denote the same parts.

The battery A, Figs. 4, 5, is composed of the cells B, which in turn are each constructed as follows: At the center of the cell is a copper plate, $b$, folded flat. Around it is wrapped a strip of felt or other absorbent material, $b'$, thereby forming a flat pile. A zinc plate, $b^2$, is then folded flatly around the felt, leaving the felt exposed at the ends of the fold, but otherwise quite or nearly inclosing the felt, and the cell is completed by means of the copper wires $b^3\ b^3$, which at one end, $b^4$, connect with the copper $b$ by being held in its fold, and at the other end connect with the zinc $b^2$ of the adjoining cell, and preferably by being soldered thereto at the fold of that plate. By having the zinc outside it will dry quicker after using; more surface is also obtained. The copper works just as well inside, because it does not matter how small it is; but with the zinc the more surface the better. The wires $b^3\ b^3$ in practice are in a single piece soldered along its central portion to the zinc, as shown in Fig. 11, and having its ends shaped and extended, as described, to connect with the copper of the adjacent cell, and thus provide for the transmission of the current, and also for uniting the cells mechanically to form a battery of any desired length, according to the number of cells used; but owing to the mode of constructing the cell of such thinness that it can be worn upon the person without interfering with the clothes or being undesirably prominent, the end cells of the battery have the wire $b^3$ extended, and shaped, substantially as shown in Figs. 1, 2, 3, 4, 12, 13, to form an eye, $b^5$, to receive the hook $c$ of the conductor-cord C.

The battery is charged by soaking it in an acid—such as vinegar—and to prevent the liquid from occasioning trouble the battery is inclosed in a moisture-proof case, D, which is also a convenience in handling the battery in removing it from and attaching it to the belt, and also in reversing the battery upon the belt, so that the polarity will be changed and either the positive end (lettered P, Fig. 4) or the negative end (lettered N) may be toward that electrode E which it is desired to use in applying a positive current to a certain point upon the person. To this end the case D is constructed so that the eyes $b^5 b^5$ project similarly from the ends, respectively, of the case, and the case at each end has an eye, $d$, by means of which the case D can be hooked by means of the hooks $f$ onto what may be termed the "main" or "outer" case, F, Figs. 1, 6, 7, 8, 9, 18, and so that the case D and inclosed battery can be turned either way and attached to the case F. This last-named case F is attached to the belt G by means of the clips $g$, attached, respectively, at the upper and lower edges or on opposite points, so that their ends point toward each other, Figs. 8, 18, which enables the case F, together with the inclosed and attached case D and battery, to be slipped upon the belt G toward either end thereof to bring the battery into the desired position upon the belt or person.

The case C can be easily removed or detached from the belt at any point along its length, since its clips $g$ only come over the edges of the belt. Thus by merely folding the belt its edges are released from the clips.

The case F is open at its ends $f' f'$ to enable the case to be inserted from either end therein.

The electrodes E are of the customary form, saving that, and by means of the clips $e$, which are of the same general structure as the clips $g$, above described, they are adapted to be slipped, like the case F, upon the belt toward either end thereof, and for the purpose of applying the electrodes to the desired part of the person, and they can be readily detached from the belt along its length.

There are two conductor-cords, C and C', leading from the opposite ends, respectively, of the battery, and connecting, respectively, with the positive and the negative (for the time being) electrode, and thereby establishing the circuit through the person of the wearer of the belt. I divide the cord connecting with the disk into two parts, $c' c'$, Fig. 1, which in turn respectively lead to the electrodes, substantially as shown, and the current is thereby directed equally through both of the electrodes. The connection of the cords C C' with the battery is made thus: One of the cords— say the cord C, Fig. 1—is connected with the end cell, and by means of the hook $c$ the other cord, C', is connected, if desired, with the end cell at the opposite end of the battery; but as it is essential to be able to regulate the intensity of the battery, provision is made for using as many of the cells of the battery as may be desired. If a more intense current is needed more cells are used, and if a less intense current is needed fewer cells are used, and the connection of the cord C' is made accordingly with the battery by means of the spring-clamp H, Figs. 4, 15, 16, 17. The end of the cord C' is joined to the clamp at its coil $h$. The parts $h' h'$ of the clamp cross each other, as shown, and after crossing turn downward, as shown in Figs. 4, 17. When the parts $h' h'$ are pressed together, as indicated in Fig. 17, the ends $h^2 h^2$ open apart from each other sufficiently to enable them to admit between them the wire $b^3$, upon which the ends $h^2 h^2$ close when the pressure upon the parts $h' h'$ is released. In this manner the cord C' can be electrically connected with the battery between any two adjoining cells. In Fig. 4 the connection is shown made midway in the length of the battery. The case D is perforated at $d'$ to enable the ends $h^2 h^2$ to be connected with the battery without opening the case. This mode of uniting the cord with the battery is especially desirable, as otherwise the cord is liable to be affected by the moisture of the battery and thereby injured.

I claim—

1. In an electric belt, the combination of the conductor-cord C', the spring-clamp H, having the coil $h$, and crossed and open-ended parts $h' h'$, with the battery-wire $b^3$, which rests between said parts, and with the adjoining battery-cells B, constructed as described, the end cells having wires $b^5$, substantially as set forth.

2. The combination of the battery, the inner case, D, having eyes $d$, the adjustable outer case, F, having hooks $f$, and the belt G, as described.

3. The case D, having the battery-eyes $b^5$, projecting from the respective ends of the case, and also an eye, $d$, at each end, with the outer case, F, having hooks $f$, and with the belt G, substantially as described.

4. In an electric belt, the electrodes having clips upon the upper and lower sides, with ends pointing toward each other, whereby said clips are adjustable upon and at any point along and readily detachable at any point from the belt.

5. The combination of the divided conductor-cord C' with the battery, and the electrodes having clips, and thereby attachable at any point and adjustable upon and along and detachable from the belt, whereby the current can be localized at any point along the belt at will.

6. The battery A, composed of the cells B, each end having an eye by which it can be connected to the electrode, combined with case F, having hooks $f$, and the belt, as described, whereby the battery can be adjusted longitudinally along the belt and reversed thereupon, substantially as described.

7. In a galvanic belt, the battery composed of cells, each of which is made of a piece of flat copper on the inside folded double, felt wrapped around the copper, zinc folded upon the outside and copper wire soldered on the inside of the zinc, whereby it can be attached to the next cell, substantially as described.

ALVA OWEN.

Witnesses:
  C. D. MOODY,
  J. W. HOKE.